United States Patent [19]

Lee

[11] Patent Number: 5,577,694

[45] Date of Patent: Nov. 26, 1996

[54] LEG BLOCK JOINING SYSTEM FOR TABLE

[76] Inventor: Yaun Hi Lee, Hyundai Apt. #3/1005 234-2, Chungryangri-dong, Dongdaemun-ku, Seoul, Rep. of Korea

[21] Appl. No.: 313,354

[22] Filed: Sep. 27, 1994

[30] Foreign Application Priority Data

Jun. 14, 1994 [KR] Rep. of Korea ................. 1994/13576

[51] Int. Cl.⁶ ............................ F16M 11/00; F16B 12/00
[52] U.S. Cl. ......................................... 248/188; 403/260
[58] Field of Search ................................ 248/188, 188.1, 248/440, 163.1; 403/260, 257, 256

[56] References Cited

U.S. PATENT DOCUMENTS

| | | | |
|---|---|---|---|
| 1,901,947 | 3/1933 | Bescherer | 248/649 X |
| 2,855,255 | 10/1958 | Sonderstrup | 403/256 |
| 3,379,398 | 4/1968 | Boccone | 248/188 |
| 4,345,849 | 8/1982 | Stenemann | 403/257 X |
| 5,230,491 | 7/1993 | Tseng | 248/188.1 |
| 5,265,972 | 11/1993 | Bahr | 403/260 X |

FOREIGN PATENT DOCUMENTS

| 826354 | 3/1938 | France | 248/188 |
|---|---|---|---|

*Primary Examiner*—Karen J. Chotkowski
*Attorney, Agent, or Firm*—Price, Heneveld, Cooper, DeWitt & Litton

[57] ABSTRACT

A leg block joining system for table is disclosed. An assembly 1 is made of a synthetic resin, and includes opposite side wall plates 3 and 3', a projected edge 2, and supporting guiding portions 4, 4', 5, 5', 6, 6', 7 and 7'. The assembly 1 further includes bolt passages 8, 8', 10 and 10' and tool passages 9, 9', 11 and 11' having small diameters, the two sets of passages being formed in a shape of cross. A leg 14 having a rectangular cross section is provided with tool holes 15, 16 and 16', and bolt holes 17, 17', 18 and 18'. The assembly 1 is inserted into the leg 14, in such a manner that the tool passages and the bolt passages of the assembly 1 should be aligned with the tool holes and the bolt holes of the leg 14. Then connecting beams 19, 19' and 19" are connected to four of the legs 14, and then, upper and lower bolts are tightened into bolt tightening holes 20, 20', 20", 21, 21' and 21", thereby firmly joining the legs 14 and the connecting beams. Then an upper plate of the table is mounted and tightened through tightening holes 22, 22", 23 and 23' thereby completing the assembling of a table.

20 Claims, 4 Drawing Sheets

5,577,694

LEG BLOCK JOINING SYSTEM FOR TABLE

FIELD OF THE INVENTION

The present invention relates to a leg block joining system including table legs and connecting beams connecting the table legs, which can be applied to various tables such as ordinary tables, dining tables, teaching tables, mounts, working tables and the like, and which is convenient for manufacturing, storing, transporting, and assembling.

BACKGROUND OF THE INVENTION

In the conventional tables such as special tables, dining tables, mounts, working tables and the like, the table legs and the connecting bar for connecting the table legs are mostly fixed. In the case of metals, welding is carried out, while, in the case of wood, nails are driven or fastenings are made by means of bolts. The products manufactured in such a manner are commercialized, and generally used. In some cases, there is an improved assembling type table which is assembled by means of bolts. However, when such a table is purchased by a user, the selling person carries the table to the user' home, and assembles the table in the user' s home, this being a troublesome task. Further, such a assembling type table does not have the four table legs, but is supported by a plurality of stacked drawers. Or such a table does not have the four table legs, but is supported by a flat supporting plates. Therefore, such a table lacks the firm supporting strength, and cannot be applied to metal tables, while the assembling of the table has to be carried out by a skilled person.

SUMMARY OF THE INVENTION

The present invention is intended to overcome the above described disadvantages of the conventional techniques.

Therefore it is the object of the present invention to provide a leg block joining system for table in which the manufacturing, storing, transporting and assembling are simple, the assembled state is firm, and even an unskilled person may carry out the assembling.

The present inventor invented the device of the present invention after studying and experimenting for a long time.

In accordance with the above objects, one form of the invention provides a leg joining assembly for a table, the table being of the type including at least one leg having a hollow portion and at least one connecting member adapted for connection to the leg. The assembly is adapted for mounting in the hollow portion of the leg and includes two pair of opposing wall members. The wall members in a first of the two pairs are generally parallel to and spaced from one another. The wall members in the second of the two pairs are also generally parallel to and spaced from one another. Each wall member is joined to at least two other wall members such that the wall members define a central opening between the opposed pairs of wall members. In addition, at least one bolt passage extends across the central opening between each of the first and second pairs of wall members. Each bolt passage is hollow and has opposite end openings which open through the opposed wall members. Each bolt passage is adapted to receive a headed bolt therein with its head positioned within the bolt passage and its threaded body directed toward a first of the opposite end openings. The second of the opposite end openings is adapted to receive a tool therethrough for engaging the bolt head and fastening the bolt body to the connecting member. Thus, when the assembly is mounted in the hollow portion of the leg with each bolt passage aligned with an aperture through the leg, each bolt is adapted to extend through a leg aperture and engage and secure the connecting member to the leg.

In preferred aspects of the invention, the bolt passages are joined and intersect one another in the form of a cross. Each bolt passage preferably includes two hollow, cylindrical sections, one section having a diameter sufficient to receive the head and threaded body of the bolt generally parallel to said one section, while the other has a smaller diameter sufficient to receive a tool, such as a screw driver or allen wrench therethrough. Preferably, the wall members extend generally perpendicular to one another as do the crossed bolt passages.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
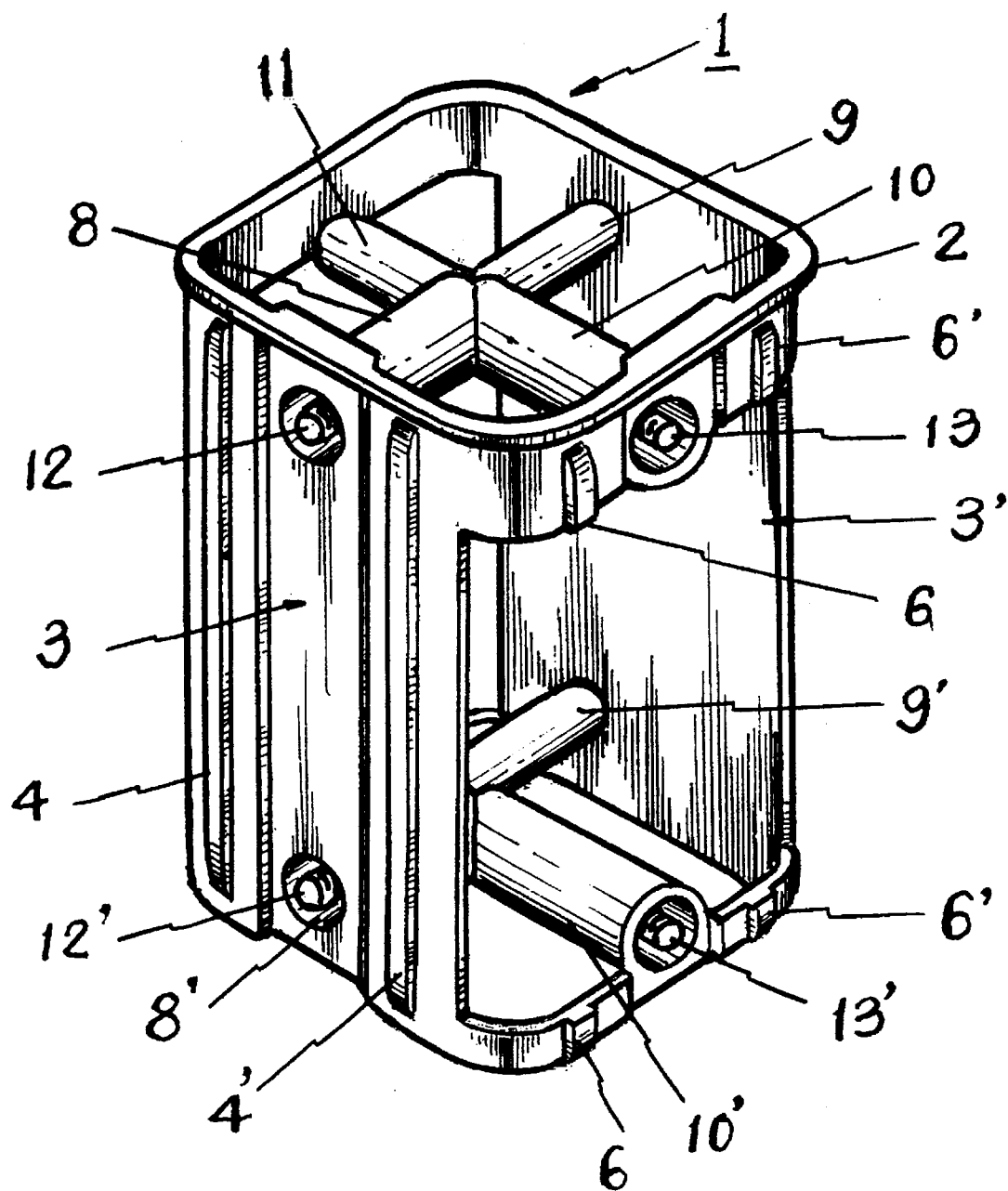
FIG. 1 is a perspective view of the assembly of the present invention.
Figure 2:
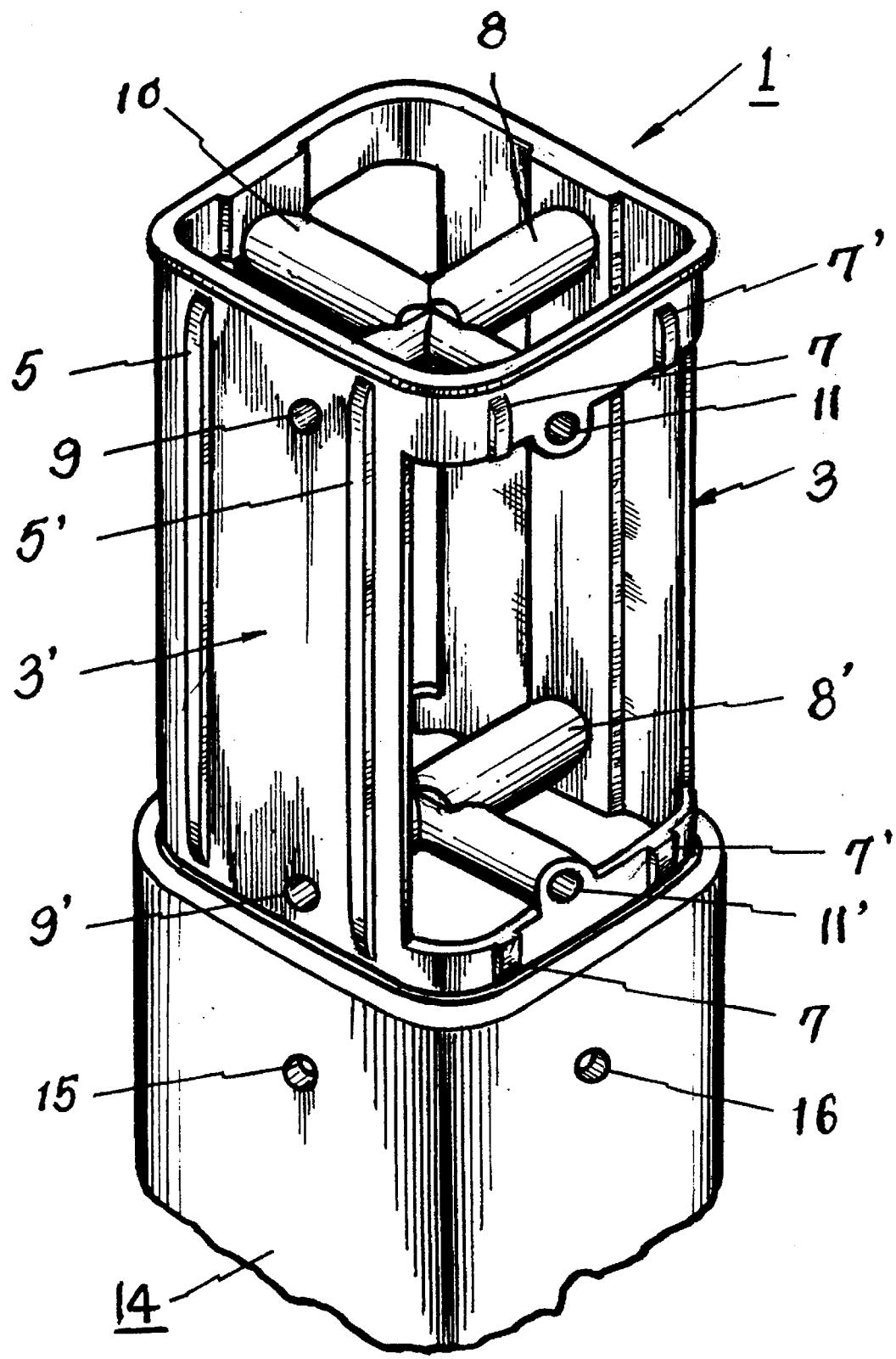
FIG. 2 is a perspective view of the other side of the assembly of the present invention, which is being coupled with the leg.

An assembly 1 of the present invention includes; two wall plates 3 and 3' formed facingly oppositely, a projected edge 2 formed along the top of the assembly 1, and supporting guiding portions 4, 4', 5, 5', 6, 6', 7 and 7' projected outwardly. Further, in the upper and lower portions of the assembly 1, there are installed bolt passages 8, 8', 10 and 10', and tool passages 9, 9', 11 and 11' in the form of a cross. The bolt passages 8, 8', 10 and 10' receive bolts 12, 12', 13 and 13', with the heads of the bolts being directed inwardly.

A leg 14 is provided with tool holes 15, 16 and 16', and bolt holes 17, 17' and 18, and the assembly 1 is inserted into the leg 14, in such a manner that the tool holes and the bolt holes of the leg 14 should be aligned with the tool passages and the bolt passages of the assembly 1.

Then connecting beams 19, 19' and 19" are connected between four of the assembled legs 14, and then, the respective bolts 12, 12', 13 and 13' are fastened into fastening holes 20, 20', 21, 21' and 21", thereby completing the assembling of the table.

The assembly of the present invention constituted as above will now be described in more detail.

The front and rear walls of the assembly 1, which is made of a synthetic resin, are cut out leaving only the upper and lower portions, while the left and right side walls are totally left. On the upper and lower portions of the assembly 1, there are installed the cross shaped bolt passages 8, 8', 10 and 10', and the cross shaped tool passages 9, 9', 11 and 11'. Here, the bolt passages 8, 8', 10 and 10' have wide diameters, so that the heads of the bolts 12, 12', 13 and 13' can be inserted. Meanwhile, the tool passages 9, 9', 11 and 11' have narrow diameters, so that only tools can be inserted. That is, the tool passages are just wide enough to allow the insertion of the body of the bolt.

Then the leg 14 which is made of a metal and which has a rectangular cross section is cut into a proper length. Then the assembly 1 is inserted into the leg 14, in such a manner that the tool passages and the bolt passages of the assembly 1 should be aligned with the tool holes 15, 16 and 16' and the bolt holes 17, 17', 18 and 18' of the leg 14. Thus the supporting guiding portions 4, 4', 5, 5', 6, 6', 7 and 7' of the assembly 1 are contacted with the inner wall surfaces of the leg 14, so that the state of FIGS. 4 and 5 should be realized. In other words, the respective bolt passages 8, 8', 10 and 10' of the assembly 1 are aligned with the bolt holes 17, 17', 18 and 18' of the leg 14, while the tool passages 9, 9', 11 and 11' of the assembly 1 are aligned with the tool holes 15, 16 and 16' of the leg 14. That is, these passages and holes are naturally aligned when the projected edge 2 of the assembly 1 is coupled with the top edge of the leg 14. The respective bolts 12, 12', 13 and 13' are loosely inserted into the bolt passages 8, 8', 10 and 10', and when the bolts are inserted, the heads of the bolts are directed oppositely, i.e., toward the tool passages 9, 9', 11 and 11'. The bolt has a cross shaped driving recess or a hexagonal driving recess, so that an ordinary screw driver or an allen wrench can be used.

Thus, after insertion of the assembly 1 into the leg 14, the opposite ends of the connecting beams 19, 19' and 19" are let to mate with the bolt holes 17, 17', 18 and 18' of the leg 14. That is, the bolt tightening holes 20, 20', 20", 21, 21' and 21" of the connecting beams 19, 19' and 19" are aligned with the bolt holes of the legs 14.

Figure 3:
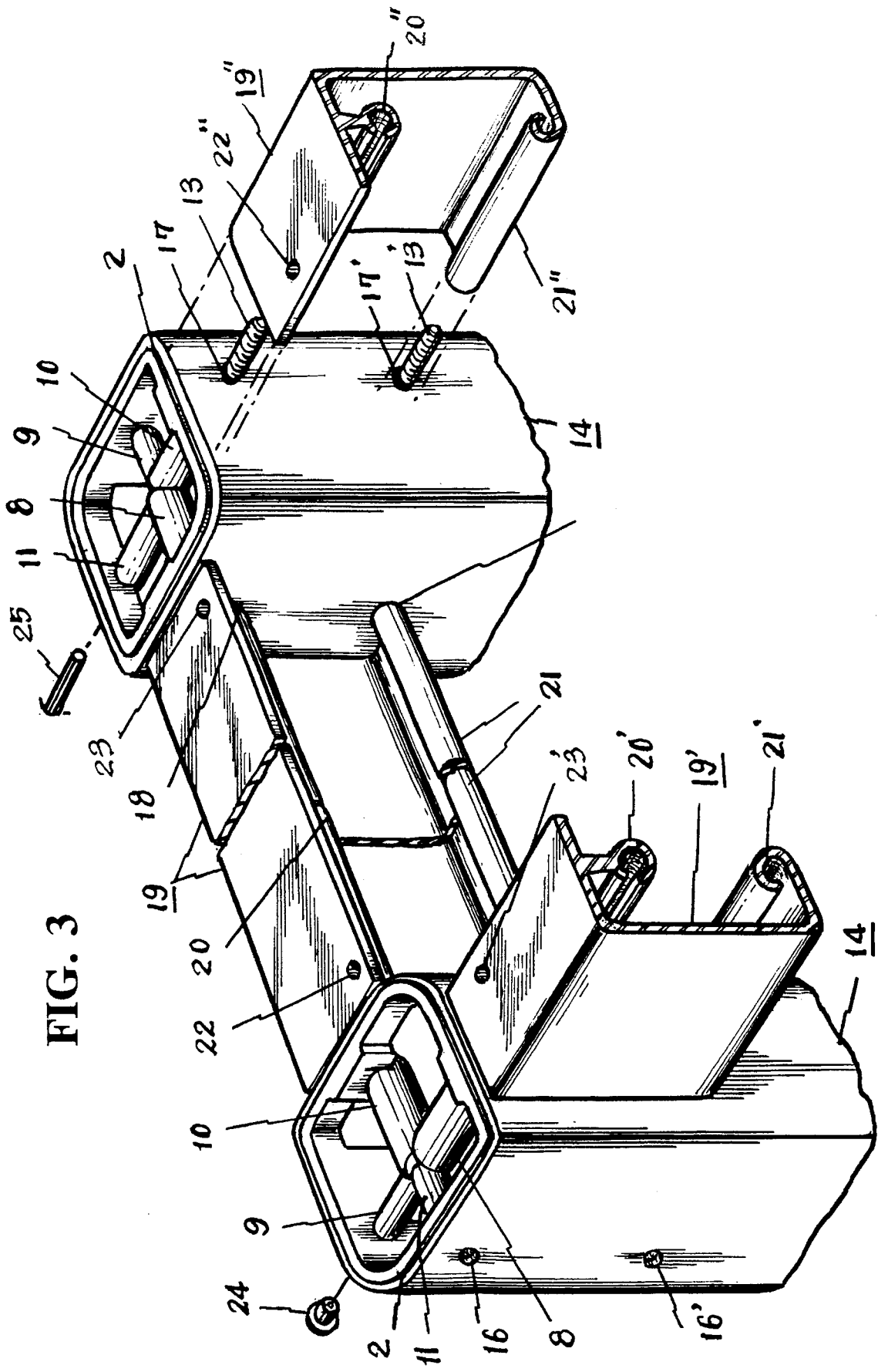
FIG. 3 is a perspective view of the legs and the connecting beams connected according to the present invention.
Figure 4:
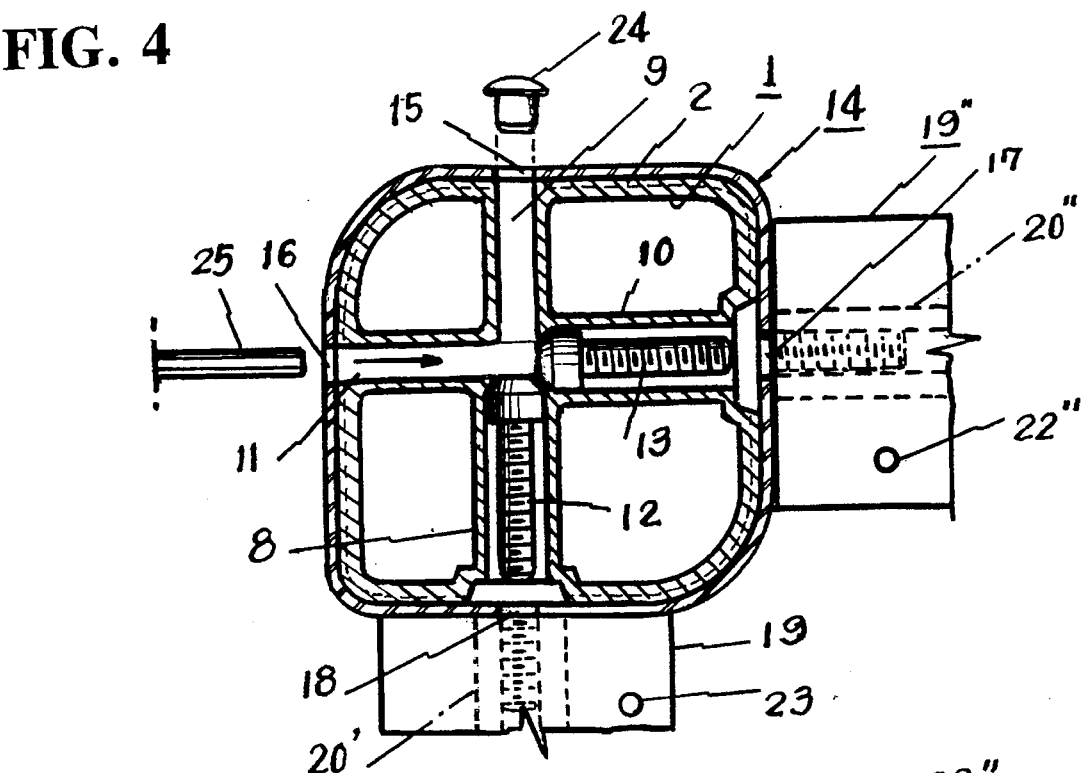
FIG. 4 is a plan sectional view of the assembly according to the present invention.
Figure 5:
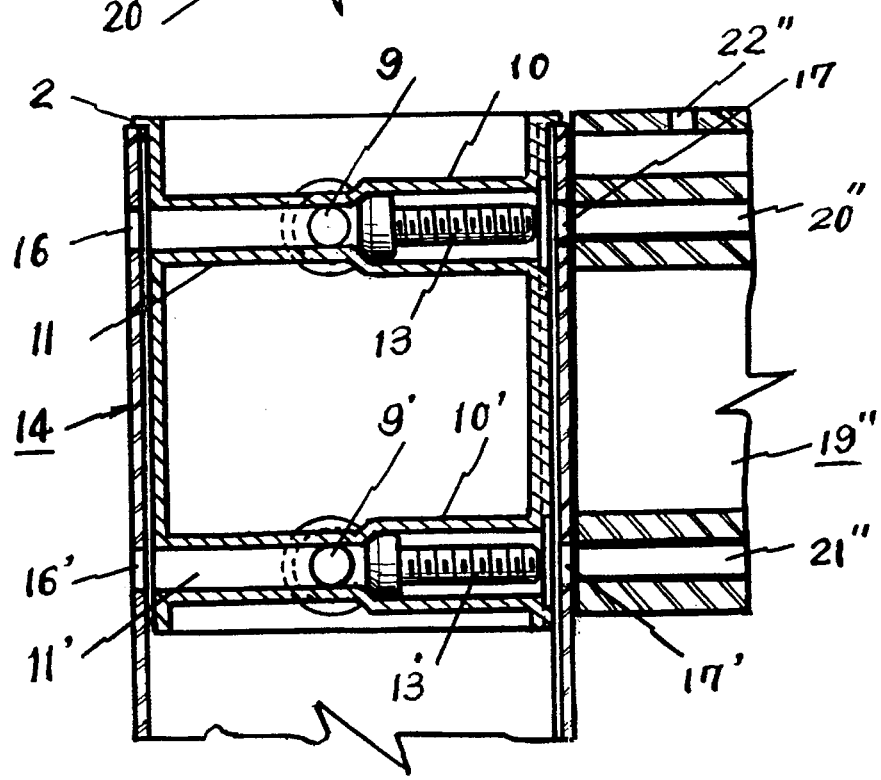
FIG. 5 illustrates a cut-out view of the assembly according to the present invention.

Then, as shown in FIGS. 3, 4 and 5, a tool 25 is inserted through the tool holes 15, 16 and 16' and through the tool passages 9, 9', 11 and 11' to tighten the bolts by putting the screw driver or the allen wrench into the cross shaped recess or the hexagonal recess of the heads of the bolts 12, 12', 13 and 13'. The bodies of the bolts 12, 12', 13 and 13' pass through the bolt holes 17, 17', 18 and 18' so as to be firmly tightened into the bolt tightening holes 20, 20', 21, 21' and 21" of the connecting beams 19, 19' and 19".

After the respective connecting beams 19, 19' and 19" are assembled with the four legs 14, an upper plate (not shown) is mounted on the total assembly, and bolts are driven into upper plate fastening holes 22, 22", 23 and 23', thereby completing the assembling of the table.

When selling the table after manufacturing it, four legs 14 with the assembly 1 fitted into each of them, four connecting beams 19, and one upper table plate are packed into one set. Therefore, the bulk of the package is small, and therefore, the loading, the storing and the transportation are convenient. When a user buys the table, the user can assemble the table with only one single tool at home, and even an unskilled person can assemble it.

According to the present invention as described above, the assembling type table has a small packed bulk, and therefore, the domestic shipping or exporting will be convenient. Further, owing to the small bulk, the packaging, loading and transporting will be convenient, and even an unskilled person can assemble the table in an easy manner while the disassembling can also be made in an easy manner by only turning the bolts. The present invention can be applied not only to ordinary tables, but also to dining tables, teaching tables, working tables and other home or office facilities requiring supporting of legs.

What is claimed is:

1. A leg block joining system for table, comprising:

a plurality of assemblies, each consisting of:

left and right wall plates supporting each of said assemblies; frontal and rear walls being cut out leaving only upper and lower portions thereof; a projected upper edge formed on each of said assemblies; supporting guiding portions formed in the number of two on each of the left and right side walls; bolt passages and tool passages formed in the shape of cross and installed on upper and lower portions of said assemblies; bolts inserted into said bolt passages with the heads of said bolts directed inwardly;

a plurality of legs, each having a rectangular cross section and having tool holes and bolt holes for receiving said assemblies so as for said tool holes and bolt holes of said legs to be aligned with said tool passages and bolt passages of said assemblies; and a plurality of connecting beams for being connected between said legs, and each of them having upper and lower bolt tightening holes for driving upper and lower bolts.

2. A leg joining assembly for tables of the type including at least one leg having a hollow portion and at least one connecting member adapted for connection to said leg, said assembly comprising:

two pair of opposing wall members, said wall members in a first of said pairs being generally parallel to and spaced from one another, said wall members in the second said pairs also being generally parallel to and spaced from one another, each wall member being joined to at least two other wall members such that said wall members define a central opening between said opposed pairs of wall members; and at least one bolt passage extending across said central opening between each of said first and second pairs of said wall members, each bolt passage including two hollow cylindrical sections, one section having a diameter sufficient to receive a head and threaded body of a bolt therein generally parallel to said one section, the other section having a smaller diameter sufficient to receive a tool such as a screwdriver or allen wrench therethrough, said passage being hollow, having opposite end openings opening through said opposed wall members, and adapted to receive a headed bolt therein with its head positioned within said bolt passage and its threaded body directed toward a first of said opposite end openings, the second of said opposite end openings adapted to receive a tool therethrough for engaging the bolt head and fastening the bolt body to a connecting member;

whereby when said assembly is mounted in the hollow portion of the leg with each bolt passage aligned with an aperture through the leg, each bolt is adapted to extend through a leg aperture and engage and secure the connecting member to the leg.

3. The assembly of claim 2 wherein said leg assembly includes at least a second bolt passage joined to and intersecting another bolt passage in the form of a cross.

4. The assembly of claim 3 wherein each bolt passage includes two hollow cylindrical sections, one section having a diameter sufficient to receive the head and threaded body of a bolt therein generally parallel to said one section, the other section having a smaller diameter sufficient to receive a tool such as a screw driver or allen wrench therethrough.

5. The assembly of claim 3 wherein said opposed pairs of wall members extend generally perpendicular to one another, said bolt passages also extending generally perpendicular to one another.

6. The assembly of claim 5 wherein said wall members include top edges which are aligned and include a flange projecting outwardly from said top edges, said flange adapted to support said assembly when inserted within a hollow leg.

7. The assembly of claim 6 wherein a portion of each of said wall members in one of said pairs of opposing wall members is cut away to define opposed openings therein.

8. The assembly of claim 7 wherein each of said wall members through which said first bolt passage end openings extend includes a recessed portion; said wall members each including raised guide members to position said assembly in a hollow leg.

9. The assembly of claim 1 wherein each bolt passage includes two hollow cylindrical sections, one section having a diameter sufficient to receive the head and threaded body of a bolt therein generally parallel to said one section, the other section having a smaller diameter sufficient to receive a tool such as a screw driver or allen wrench therethrough.

10. The assembly of claim 2 wherein said wall members include top edges which are aligned and include a flange projecting outwardly from said top edges, said flange adapted to support said assembly when inserted within a hollow leg.

11. The assembly of claim 2 wherein a portion of each of said wall members in one of said pairs of opposing wall members is cut away to define opposed openings therein.

12. A leg joining assembly for tables comprising:

at least two table legs, said legs having a hollow portion with a pair of apertures therethrough;

at least one connecting member adapted to extend between said legs; and a leg joining assembly mounted in said hollow portion of at least one of said table legs, said assembly including two pair of opposing wall members, said wall members in a first of said pairs being generally parallel to and spaced from one another, said wall members in the second of said pairs also being generally parallel to and spaced from one another, each wall member being joined to at least two other wall members such that said wall members define a central opening between said opposed pairs of wall members;

a pair of headed bolts each having a head and a threaded body; and at least one bolt passage extending across said central opening between each of said first and second pairs of said wall members, each bolt passage being hollow, having opposite end openings opening through said opposed wall members, and receiving one of said headed bolts therein generally parallel to said bolt passage, said head of said bolt positioned within said bolt passage and said threaded body directed toward a first of said opposite end openings, the second of said opposite end openings adapted to receive a tool therethrough for engaging said bolt head and fastening said bolt body to said connecting member;

each of said bolt passages being aligned with one of said leg apertures; each of said threaded bodies of said bolts positioned within said bolt passage extending through one of said leg apertures and engaging and securing said connecting member to said leg.

13. The assembly of claim 12 wherein said bolt passages are joined to and intersect one another in the form of a cross.

14. The assembly of claim 13 wherein each bolt passage includes two hollow cylindrical sections, one section having a diameter sufficient to receive said head and threaded body of one of said bolts therein, the other section having a smaller diameter sufficient to receive a tool such as a screw driver or allen wrench therethrough.

15. The assembly of claim 13 wherein said opposed pairs of wall members extend generally perpendicular to one another, said bolt passages also extending generally perpendicular to one another.

16. The assembly of claim 15 wherein said wall members include top edges which are aligned and include a flange projecting outwardly from said top edges, said flange supporting said assembly in said hollow portion of said leg.

17. The assembly of claim 16 wherein a portion of each of said wall members in one of said pairs of opposing wall members is cut away to define opposed openings therein.

18. The assembly of claim 17 wherein each of said wall members through which said first bolt passage end openings extend includes a recessed portion; said wall members each including raised guide members to position said assembly in said hollow portion of said leg.

19. The assembly of claim 12 wherein each bolt passage includes two hollow cylindrical sections, one section having a diameter sufficient to receive said head and threaded body of one of said bolts therein, the other section having a smaller diameter sufficient to receive a tool such as a screw driver or allen wrench therethrough.

20. The assembly of claim 12 wherein said wall members include top edges which are aligned and include a flange projecting outwardly from said top edges, said flange engaging and supporting said assembly in said hollow portion of said leg.

* * * * *